Patented Dec. 23, 1930

1,786,383

UNITED STATES PATENT OFFICE

CECIL ROY BRABAZON YOUNG, OF HAMBURG, GERMANY

PROCESS OF PURIFYING NATURAL AND ARTIFICIAL MATTER

No Drawing. Application filed August 30, 1926, Serial No. 132,660, and in Germany September 11, 1925.

My invention relates to improvements in the process of purifying natural and artificial matter, such for example as minerals and rock, and more particularly in the process in which the matter to be purified is first disintegrated and thereafter subject to the action of suitable acids such as sulfuric acid and hydrochloric acid at elevated temperature and thereafter thoroughly washed, metallic iron being in some cases added to the said purifying medium. The object of the improvements is to provide a process which is particularly effective so that minute disintegration of the matter to be purified is not necessary, and comparatively large pieces of the matter may be subjected to the process, and that heating of the matter may be dispensed with. Another object of the improvements is to provide a process by means of which purification of the matter is completed within a comparatively short time, and in which the end of the purification can be readily ascertained without taking samples of the matter and subjecting the same to more or less complicated tests. Further, an object of the improvements is to provide a process which results in a perfectly purified product of uniform quality and in which the impurities dissolved from the matter can be completely separated without material loss of valuable matter and dried at low cost.

With these objects in view my invention consists in disintegrating the matter to be purified to granular form, and treating the same by means of a purifying liquid consisting of one or more mineral acids and an organic substance having a reducing and dissolving action on metal oxides, such for example as an organic acid or the salts thereof.

Example

The matter to be purified, such for example as quartz or feldspar, is first washed by means of water, disintegrated into granular form, the grains having a size of about 8 millimeters, and placed in a suitable receptacle. Thereafter so much sulfuric acid of medium strength, or a mixture thereof with hydrochloric acid is added that the material to be purified is just covered by the acid. If only sulfuric acid is used I prefer to add sodium chloride. Now I add a certain amount of a suitable organic acid such as oxalic acid to the receptacle, the amount of the said acid depending on the degree of the impurity of the matter and varying from 1 to 2 kilograms per cubic meter of the sulfuric acid, whereupon the matter is heated by means of steam from ½ to 1 hour at boiling temperature. During this period of time the liquid becomes dim, and it assumes a yellow-brown color by reason of the dissolution of the iron and manganese and other compounds, until, finally, it becomes clearer while a little carbonic acid is developed, which indicates that the purification is completed. Thereby I am enabled to avoid loss of time and steam.

As an example of an operative formula I may use the following: 18% sulfuric acid, 2% sodium chloride, 1% oxalic acid.

After the end of the purification has thus been ascertained the liquid is removed, and the matter is boiled once or twice with fresh water, and finally it is washed by means of cold water. Now the matter is dried and ground to the desired degree of fineness. There is no danger of the matter being again spoiled in the grinding apparatus, because there is no residue of acid.

In a modification of the process the purifying liquid described herein is made to act on the matter in a cold state by stirring and by means of compressed air. In this case the time required for purification is about the double or treble of that required when purifying at elevated temperature.

The action of the organic acids or the salts thereof, and more particularly that of the oxalic acid or the salts thereof, is based not only on the reducing property, but further on the fact that iron compounds are readily and completely dissolved in the said organic substances. For this reason other organic substances having the same or similar properties may be used for the same purpose.

I claim:

1. The herein described process of removing impurities from natural or artificial matter such as minerals and rock, which consists in purifying the disintegrated matter by means of a liquid consisting essentially of sulphuric acid, hydrochloric acid and oxalic acid.

2. The herein described process of removing impurities from natural or artificial matter such as minerals and rock, which consists in purifying the disintegrated matter by means of re-agent consisting of sulphuric acid, a chloride and a source of oxalic acid radical.

3. The herein described process of removing impurities from natural or artificial matter such as minerals and rock which consists in heating the disintegrated matter to boiling temperature with steam with a re-agent consisting of sulphuric acid, hydrochloric acid and oxalic acid.

In testimony whereof I have hereunto set my hand.

CECIL YOUNG.